United States Patent [19]

Holman

[11] 4,100,605
[45] Jul. 11, 1978

[54] ERROR STATUS REPORTING

[75] Inventor: Bruce James Holman, Broomfield, Colo.

[73] Assignee: International Business Machines Corporation, Armonk, N.Y.

[21] Appl. No.: 745,512

[22] Filed: Nov. 26, 1976

[51] Int. Cl.² ............................................. G06F 1/00
[52] U.S. Cl. .................................................. 364/900
[58] Field of Search ...................... 364/900 MS File; 235/153 AK; 340/173 R, 174 MC; 307/221 R; 328/37

[56] References Cited

U.S. PATENT DOCUMENTS

| 3,516,072 | 6/1970 | Wallace, Jr. | 364/900 |
| 3,704,363 | 11/1972 | Salmassy et al. | 235/153 AK |
| 3,972,031 | 7/1976 | Riemenschneider et al. | 340/173 R |

*Primary Examiner*—Raulfe B. Zache
*Attorney, Agent, or Firm*—Herbert F. Somermeyer

[57] ABSTRACT

A plurality of status reporting units are connected respectively to a plurality of shift registers. The shift registers receive and store status signals from the status reporting units. Each of the shift registers include an OR circuit for combining the signals from all of the stages of the respective shift registers. An output of the OR circuit is connected to the input of one stage of a shift register other than the shift register supplying signals thereto. The arrangement is such that the one stage in the respective shift registers indicate the status of one or more error status reporting units. A status analyzing unit receives signals from the various shift registers for analyzing error patterns of the status reporting units in response to receiving a signal that at least one of the status reporting units has error status to report.

9 Claims, 1 Drawing Figure

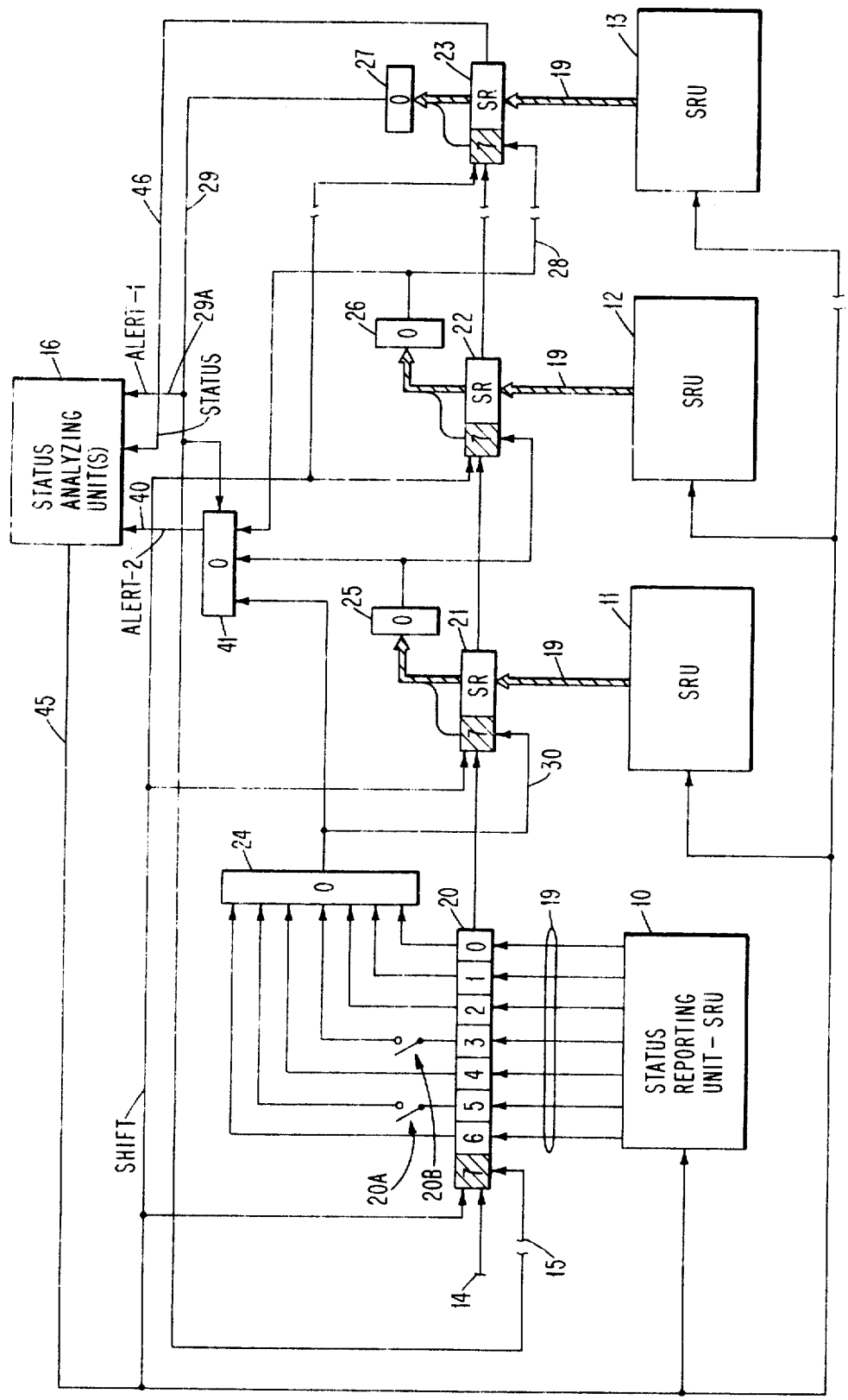

ERROR STATUS REPORTING

BACKGROUND OF THE INVENTION

The present invention relates to status reporting units, particularly those units which reliably report status signals from one or more status reporting units. In data processing systems having a plurality of interconnected data processing units such as computers, tape drives, disk files, printers, display units and the like, diagnosis of error status including the detection that an error has occurred becomes a complex problem. The difficulty arises in that the status reporting circuits themselves may have an error condition, thereby blocking report of an error condition in an associated unit. Further, it is desired to control the cost of such units by providing a simple yet effective error tolerant status reporting system, particularly for reliably reporting error conditions.

SUMMARY OF THE INVENTION

It is an object of the present invention to provide a reliable alternate path status reporting unit for use in a multiunit interconnected system.

In accordance with certain aspects of the invention, the status reporting unit includes a signal propagation unit having a plurality of registers preferably shift registers. Each of the shift registers includes a plurality of shift register stages which are individually settable. An OR circuit associated with the respective ones of said shift registers combine the signal states of the shift registers such that any one stage being set results in a signal output to the respective OR circuits. The OR circuits then have an output connected to another register for indicating that one or more error signals are resident in a different shift register. By combining the shift register indications to a single line a status analyzing unit can be actuated to perform diagnostic operations including shifting the signals from the shift registers to obtain a data pattern for analyzing location of an error.

The foregoing and other objects, features, and advantages of the invention will be apparent from the following more particular description of preferred embodiments of the invention, as illustrated in the accompanying drawing.

THE DRAWING

The single FIGURE shows a block schematic diagram of apparatus incorporating the present invention.

DETAILED DESCRIPTION

The present invention is particularly useful in connection with a plural unit data processing system or subsystem. In one application of the invention a plurality of status reporting units (SRUs) 10, 11, 12 and 13 include two tape drives 10 and 11, and automatic tape library 12. The automatic tape library is that constructed in accordance with Burke et al. U.S. Pat. No. 3,941,738. SRU 13 can be a record storage disk unit commonly referred to as a disk file. In addition, other SRUs (not shown) can provide inputs to the status reporting system as indicated by the truncated lines 14 and 15. The status reporting system is connected to a status analyzing unit 16 which may be a programmable digital computer of any construction, a programmable control unit of known construction, or other type of programmable or monitoring unit. Not shown in the drawing are the usual data signal busses, tag lines and the like.

Each of the SRUs 10-13 supply status signals over their respective cables 19 to the respective shift registers 20-23. Each of the shift registers includes a plurality of settable stages represented in shift register 20 by the enumerated box as 0-7. Bit containing stages 0-6 of each of the shift registers 20-23 receive and store status signals from over the respective cables 19 from the respective SRUs 10-13. The shift register status signals may represent operations status, machine states, machine error conditions, data error conditions and the like. In a constructed embodiment it was desired to monitor for corrective action predetermined machine errors, hereinafter referred to as status or stages to be monitored. The signal state of each of the stages to be monitored in all of the shift registers 20-22 are supplied to the respective OR circuits 24, 25 and 26. Shift register 23 supplies its signals from its stages 0-2, 4 and 6 to an OR circuit 27 for purposes as will become apparent. Stages 3 and 5 of SR 20 can be selectively monitored by closing switches 20A and 20B.

The OR circuits 24-26 propagate error status along the shift register interconnections. That is, OR circuit 24 combines those signal states of shift register 20 stages to be monitored and supplies same as a setting or resetting signal over line 30 to stage 7 of shift register 21. Any binary "1" (error) in register 20 causes stage 7 of register 21 to be set. Therefore, shift register 21 stage 7 indicates the error status of SRU 10 being monitored. The arrangement can be such that when SRU 10 and its associated circuits 20, 24 have power removed, the resultant ground reference potential on line 30 sets stage 7 of shift register 21. This being the case, an error condition, i.e., power off, is logged in associated SRU 11. When SRU 11 has a separate power supply, a power down of SRU 10 is immediately propagated as an error condition.

Similarly, OR circuit 25 responds to the signals to be monitored from shift register 21 to report error status being monitored to stage 7 of shift register 22. Again, SRU 12 has an independent power supply from SRU 11 for indicating power off error to status analyzing unit 16. Identically, OR circuit 26 propagates the error signals being monitored over line 28 to the next connected SRU shift register. This action is repeated until the last unit in the string, SRU 13, receives an error signal in its bit 7 of shift register 23. In the above-described manner, error conditions are combined into a single bit 7 position in the last connected shift register 23. OR circuit 27 combines the signals to be monitored from SR 23, including stage 7, and supplies an ALERT-1 (interrupt) signal over lines 29, 29A to SAU 16. Such an error alert signal is supplied to status analyzing unit 16 over line 29A whenever any one stage to be monitored in any of the shift registers 20-23 is active (set to "1") either by a power down or by error status reported by one of the SRUs 10-13. An alternate alert signal, ALERT-2 may be supplied over line 40 from OR circuit 41. OR circuit 41 combines signals from all of the OR circuits 24-27 to generate the line 40 alert signal. Therefore, each of the OR circuits shown in the FIGURE may provide two purposes; one generates an alert signal on line 40, and the second indicates error status to an adjacent unit. Therefore, if bit 7 of shift register 21 is active, which results in an alert signal, status analyzing unit 16 then interrogates the shift registers to find where the problem arose. From the following description it will become apparent that the resultant data pattern will indicate that status reporting unit 10 has power off or depending upon the bit configuration of shift register 20, has a predetermined error condition reported via cable 19.

The group error signal from OR circuit 27 may also be supplied to SR 20 to set its bit 7. In that instance, bit 7 is not connected to OR 24. It is necessary to limit propagation of the group error status signals for preventing ambiguity in indicating error locations.

Status analyzing unit 16 supplies a shift signal over line 45 to all of the shift registers 20–23. This shift signal is timed such that the signal contents of all of the serially connected shift registes (SR) 20–23 are serially shifted therethrough thence over line 46 to the status analyzing unit which then collects the data patterns stored in the respective shift registers. Clean status, i.e., no error condition, is represented by all zeros in bits 0–6 of the respective byte-length shift registers. If the shift register (SR) 23 byte is all zeros, the status analyzing unit 16 knows that SRU 13 is okay . Bit 7 shows the error status of SRUs 10–12; if bit 7 is set to a one condition SAU 16 immediately knows that one of the other SRUs 10–12 has an error condition. The second byte from SR 22 having bits 0–6 are all zeros and bit 7 a one indicates that an error is in either SRU 10 or 11. Then finally upon receiving the byte corresponding to SR 21, status analyzing unit 16 knows that SRU 10 is the error reporting unit. For a nonzero byte in SR 20 in bit position 0–6 the pattern would indicate the cause of the fault in SRU 10.

When shifting the signals through the shift registers 20–23 it is important that the SRUs 10–13 do not insert additonal status. Accordingly, the shift signals on line 45 are sent to the respective SRUs 10–13 for inhibiting status transfer to the shift registers. Upon completion of the shift, status is again automatically reported by the respective SRUs to their respective shift registers. This is achieved, for example, by providing time outs in the respective SRUs such that the last shift pulse no longer will reset the timer allowing it to time out for facilitating further status reporting.

While the status reporting has been shown as a serial shift over line 46 it is possible when desired to connect all bits of each of the shift registers over an 8 bit wide cable to the status analyzing unit 16. Then the shift pulses sequentially cause readout of the respective shift registers to the status analyzing unit.

The status analyzing unit 16 may consist of a plurality of independent programmed units such as computers, programmable controllers, and the like. One of such units may be denominated as the primary unit and supply the shift pulses. In the alternative, any of the analyzing units may supply a shift pulse all in accordance with known techniques.

Bit 7 of SR 20 may be a SRSR checking bit. This bit being set to a "1" whenever the SRSRs are receiving status from SRUs 10–13 can be used to verify operation of the SRSRs. Assume no error status is being reported. SAU 16 commands a shift out of status signals by activating shift line 45. The binary 1 in bit 7 of SR 20 traverses all stages of all SRSRs before reaching SAU 16. For properly operating SRSRs, SAU 16 sees an error free condition as a string of zeros followed by a single one from bit 7 of SR 20. Any other pattern indicates an error condition in the status reporting circuits.

While the invention has been particularly shown and described with references to preferred embodiments thereof, it will be understood by those skilled in the art that various changes in form and details may be made therein without departing from the spirit and scope of the invention.

What is claimed is:

1. A digital signal propagation unit, including in combination,
   a first plurality of shift registers, each said shift register having a plurality of settable shift register stages, and being interconnected as a single string of serially connected shift registers, and
   a plurality less than said first plurality of OR circuits respectively receiving signals from stages of predetermined ones of said plurality of shift registers and each said OR circuits each having an output connected to one of said shift register stages in other than those shift registers from which signals are received by such OR circuit.

2. The unit set forth in claim 1 further including in combination, less than all of said stages in at least one of said shift registers being connected to a respective one of said OR circuits.

3. The unit set forth in claim 1 further including means to simultaneously shift all signals in all of said shift registers, and
   means in each of said shift registers for independently receiving signals for storage therein.

4. A data processing system having a status reporting unit including in combination,
   a status analyzing unit for receiving status,
   a plurality of status reporting units for supplying status signals, some of said status signals being error indicating signals,
   a like plurality of registers, each having a plurality of stages, respectively connected to said status reporting units for receiving said status signals,
   a like plurality of OR circuits, respectively connected to said registers, having inputs from predetermined ones of said stages of said respective registers and having an output,
   each of said plurality of registers less one having a stage for receiving signals from the output of said respective OR circuits less one, and
   one of said OR circuits being connected to said status analyzing unit for supplying an alert signal thereto.

5. The data processing system set forth in claim 4 further including a signal transfer line extending from said status analyzing units to said registers,
   signal transfer lines extending from said registers to said status analyzing unit, and
   means in said registers for transferring the signal content thereof to said status analyzing unit in response to a status transfer signal.

6. The data processing system set forth in claim 5 wherein a predetermined number of said stages are connected to said respective OR circuits, said predetemined number being less than all of the states in at least one of said registers.

7. The data processing system set forth in claim 4 wherein said registers are shift registers, means serially connecting all of said shift registers to form a string of such shift registers whereby signal contents of one register are shifted through all of the remaining registers, and
   a data connection from said one register to said status analyzing unit for transferring status signals from all of said shift registers in a serial fashion.

8. The data processing system set forth in claim 4 wherein each of said ones of said stages being set by said OR circuits respectively being connected to another of said OR circuits except that one of said registers does not have a one of said stages.

9. The data processing system set forth in claim 4 wherein each of said registers is a shift register,
  means interconnecting said shift registers for forming a serial string of said shift registers whereby signal contents of all of said registers can be shifted through a one of said shift registers,
  said a one shift register having its corresponding OR circuit connected to said status analyzing unit and its output connected to said status analyzing unit whereby said status analyzing unit receives status signals serially from said a one shift register,
  a second one of said shift registers not receiving signals from said OR circuits,
  said plurality of shift registers less said second one having an end one of said respective stages receiving signals from said OR circuit of an adjacent one of said shift registers whereby the pattern of status signals in said end one stages indicate unit in error, and
  means for serially shifting the status signals through said shift registers to said status analyzing units.

* * * * *